United States Patent
Wuerstlin et al.

[15] 3,674,695
[45] July 4, 1972

[54] ELECTRICAL INSULATING COMPOSITIONS BASED ON OLEFIN POLYMERS

[72] Inventors: Franz Wuerstlin; Franz Feichtmayr, both of Ludwigshafen, Germany

[73] Assignee: Badische Anilin & Soda-Fabrik Aktiengesellschaft, Ludwigshafen/Rheinland, Rheinland-Pfalz, Germany

[22] Filed: May 11, 1970

[21] Appl. No.: 35,963

[30] Foreign Application Priority Data

May 9, 1969 Germany ...................... P 19 23 708.2

[52] U.S. Cl. ..................... 252/63.2, 252/63.7, 260/45.9 R, 260/566 F
[51] Int. Cl. ................. C07c 119/00, C08f 45/60, H01b 3/18
[58] Field of Search ............... 252/63, 63.2, 63.7; 260/566 F, 260/45.9 R

[56] References Cited

UNITED STATES PATENTS

| | | | |
|---|---|---|---|
| 3,041,165 | 6/1962 | Süs et al. | 96/1 |
| 3,303,162 | 2/1967 | Fuchsman | 260/45.75 |
| 3,321,436 | 5/1967 | Stilz et al. | 260/45.8 |
| 3,350,312 | 10/1967 | Gross et al. | 252/63.2 |
| 3,367,908 | 2/1968 | Peterson et al. | 260/45.85 |

Primary Examiner—Robert F. Burnett
Assistant Examiner—Robert A. Dawson
Attorney—Johnston, Root, O'Keeffe, Keil, Thompson & Shurtleff

[57] ABSTRACT

Electrical insulating materials based on olefin polymers and containing agents for increasing their electric strength. The electrical insulating materials according to the invention contain special azomethines as the agents for increasing electric strength. Insulations prepared from these materials do not fail even under prolonged influence of a high voltage.

3 Claims, 1 Drawing Figure

PATENTED JUL 4 1972
3,674,695
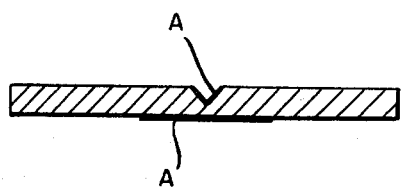
INVENTORS:
FRANZ WUERSTLIN
FRANZ FEICHTMAYR
BY: Johnston, Root, O'Keeffe, Keil, Thompson & Shurtleff
ATT'YS

ELECTRICAL INSULATING COMPOSITIONS BASED ON OLEFIN POLYMERS

The present invention relates to electrical insulating compositions based on olefin polymers and containing agents for increasing electric strength.

Conventional electrical insulating materials (i.e., those without agents for increasing electrical strength) based on olefin polymers are known to have a number of advantages over comparable other electrical insulating materials. They have the disadvantage however that they have relatively poor electric strength, i.e., that insulations prepared therefrom fail under the influence of a relatively high electric potential after only a short time or, in other words, have a short life. This property makes conventional electrical insulating compositions based on olefin polymers unsuitable for high-voltage applications, and particularly unsuitable as insulating materials for high-tension cables because in this application long life of the insulation under the action of high electric field strengths is an essential prerequisite.

It is known from U.K. Patent Specifications Nos. 1,083,113 and 1,083,114 that this disadvantage can be overcome by adding to the polyolefin-based electrical insulating materials special agents for increasing their electric strength. These agents are chemical compounds which contain groups having a strong conjugation effect, particularly compounds which contain one or more nitro groups with or without other reactive groups. The use of such compounds is accompanied by a number of other disadvantages: the compounds may be injurious to health and/or explosive; they may give rise to undesirable secondary reactions in insulating materials containing peroxides; or they may be solid with the consequent risk of separation (efflorescence, formation of nodules). Since incorporation of the agent into the insulating composition and the processing of the insulating composition itself have to be carried out at fairly high temperatures (olefin polymers have fairly high melting points) the first-mentioned disadvantages are particularly serious (risk of poisoning, risk of explosion, risk of decomposition of peroxide).

Other substances conventionally used for increasing the electric strength of electrical insulating materials, namely unsaturated perhalogenated hydrocarbon compounds (cf. German published application DAS 1,141,081), have the disadvantage that they tend to form hydrogen halides. The special hydrocarbons proposed as agents for increasing electric strength in German published application DAS 1,248,773 do not have this disadvantage, but have to be used in undesirably large amounts.

The present invention has for its object to provide electrical insulating materials of the abovementioned type which do not have the said disadvantages or have them to a much lesser extent.

We have found that this object is achieved by using special azomethines as agents for increasing electric strength.

The invention therefore consists in polyolefin-based electrical insulating compositions which contain an agent for increasing electric strength. Compositions in accordance with this invention contain, as the agent for increasing electric strength, a compound having the general formula:

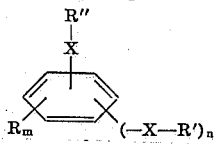

where
$m$ denotes one of the integers 0 to 2;
$n$ denotes one of the integers 0 and 1;
X denotes the group —CH = N—;
R denotes methyl, ethyl or hydroxyl;
R' denotes a $C_2$ to $C_8$ alkyl group or a group having the formula

where $p$ denotes one of the integers 0 to 4 and R''' denotes a $C_1$ to $C_6$ alkyl group or a $C_1$ to $C_6$ alkoxy group, with the proviso that if $p$ denotes one of the integers 2 to 4 the radicals R''' may be identical or different and the total number of carbon atoms in the radicals R''' does not exceed 18; and
R'' denotes a $C_1$ to $C_{20}$ alkyl group or is identical with R'.

Those compounds are preferred in whose formulae
$m$ denotes zero;
$n$ denotes 1;
$p$ denotes one of the integers 0 to 2;
R denotes methyl or ethyl;
R''' denotes a $C_1$ or $C_2$ alkyl group; and
R'' is identical with R'.

In the preferred compounds it is advantageous for the groups —X—R' and —X—R'' to be in meta- or para-position to each other.

Specific examples of particularly suitable compounds are those having the following formulae:

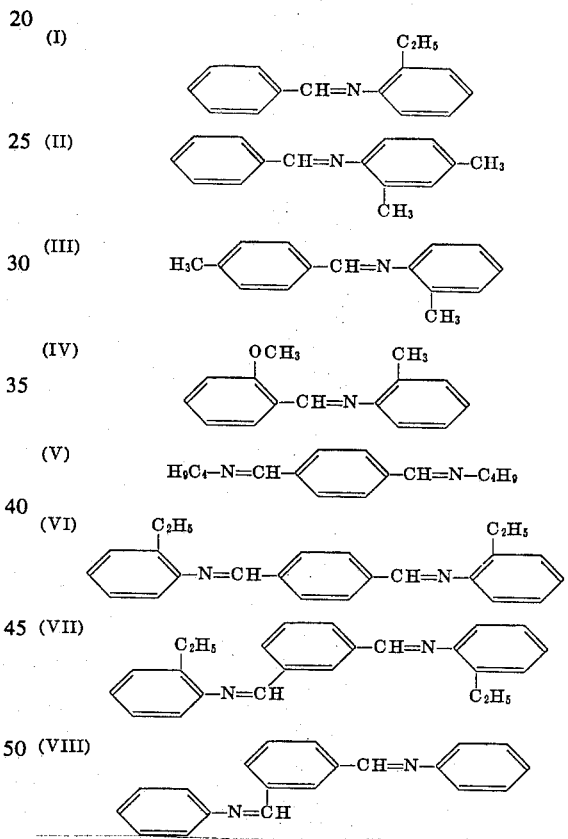

In every case it is advantageous if the azomethines are liquid at temperature below 50° C. It has further been found to be advantageous for the azomethines to be used in an amount of from 0.5 to 5 percent by weight, preferably from 1 to 3 percent by weight, with reference to the total weight of the insulating composition. For the purposes of the present invention the azomethines may be used alone or as mixtures of two or more of these compounds.

The electrical insulating materials according to the invention are based on olefin polymers. For the purposes of this invention, olefin polymers are defined as those conventionally understood by this term (cf. for example the abovementioned U.K. patent specifications). It includes in particular homopolymers and copolymers of ethylene, especially polyethylenes having a density of from 0.918 to 0.960, preferably a density of about 0.920. In addition to the olefin polymer, the insulating compositions may contain conventional auxiliaries and additives, for example crosslinking agents such as peroxides; stabilizers against thermal degradation; light stabilizers; carbon black and other pigments or fillers.

Production of the insulating materials from their components may be carried out in a conventional way with conventional equipment, particularly by homogenizing at temperatures of from 150° to 170° C in screw or roller mixing equipment.

Electrical insulating compositions according to this invention are particularly suitable for cables and especially for high-tension cables.

The invention is illustrated by the following Examples. Parts and percentages specified in the Examples are by weight.

The measured value referred to as "number of breakdowns" in the Examples determined as follows:

Circular test discs are prepared in a press by a conventional method from the insulating material; they have a diameter of 69 mm and a thickness of 5 mm and are provided with a central conical depression (depth of cone 4 mm, vertex angle of the cone 50°). The conical depression and a part of the flat surface on the reverse side (on a circle having a diameter of 25 mm) are metallized with silver (about 0.1 mm in thickness) (cf. the drawing, reference A). The two metal layers serve as electrodes in the electric strength test, high voltage being applied to the conical electrode by a needle, whereas the flat electrode on the reverse side is earthed. All tests are carried out beneath the surface of oil.

An effective voltage of 20 kilovolts (50 cycles per second) is applied to 10 test discs of each type for 1 hour and the number of test discs which have failed is indicated in the appropriate column in the Table of the Examples. The remaining test discs (i.e., those which have not failed) are then subjected to an effective voltage of 25 kilovolts (50 cycles per second) for one hour and again the number of breakdowns is noted. Test discs which still have not failed are subjected to an effective load of 30 kilovolts (50 cycles per second) for 1 hour and again the number of breakdowns is registered. In Example 1 the series is continued at an effective load of 35, then 40 and then 45 kilovolts (50 cycles per second), in each case for 1 hour. It may be seen for example from the Table in Example 1 that polyethylene stabilized according to this invention withstands the first three voltage stages without breakdown and only in the fourth stage two of the total of 10 test discs (= 20 percent), in the fifth stage five (= 50 percent) and in the sixth stage two (= 20 percent) of the discs fail. On the other hand, the same polyethylene which does not however contain an agent according to this invention fails to the extent of 80 percent (eight test discs) in the first voltage stage and to the extent of 20 percent (two test discs) in the next stage.

EXAMPLE 1

100 parts of a commercial granulated polyethylene having a density of 0.918 is mixed in a conventional manner on a mixing roller at a temperature of 160° C with 2 parts of the azomethine having the formula indicated at (I) in the description to give a homogeneous mixture. Test discs of the type defined above are made from the composition thus obtained.

For comparison, the same procedure is followed but without using the azomethine.

The values obtained in testing the discs are given in the following Table:

| | Number of breakdowns at | | | | | |
| --- | --- | --- | --- | --- | --- | --- |
| | 20 kv | 25 kv | 30 kv | 35 kv | 40 kv | 45 kv |
| Example 1 | 0 | 0 | 0 | 2 | 5 | 2 |
| Blank test | 8 | 2 | — | — | — | — |

EXAMPLES 2 to 8

The procedure followed is completely analogous to that in Example 1 but the types and amount of azomethines indicated in the following Table are used. The values obtained are also given in the Table. The Roman numerals indicated in the Table refer to the azomethines with the formula given under these numerals in the description.

| Example | Azomethine Type Parts | Number of breakdowns at | | |
| --- | --- | --- | --- | --- |
| | | 20 kv | 25 kv | 30 kv |
| 2 | II 2 | 0 | 0 | 0 |
| 3 | III 2 | 0 | 0 | 0 |
| 4 | IV 2 | 0 | 0 | 0 |
| 5 | V 2 | 0 | 0 | 0 |
| 6 | VI 2 | 0 | 0 | 1 |
| 7 | VII 2 | 0 | 0 | 0 |
| 8 | VIII 2 | 0 | 0 | 2 |

We claim:

1. An electrical insulating composition consisting essentially of a polyethylene having a density of 0.918 to 0.960 and 0.5 to 5 percent by weight, based on said composition, of an agent for increasing electrical strength selected from the group consisting of compounds of the formulae

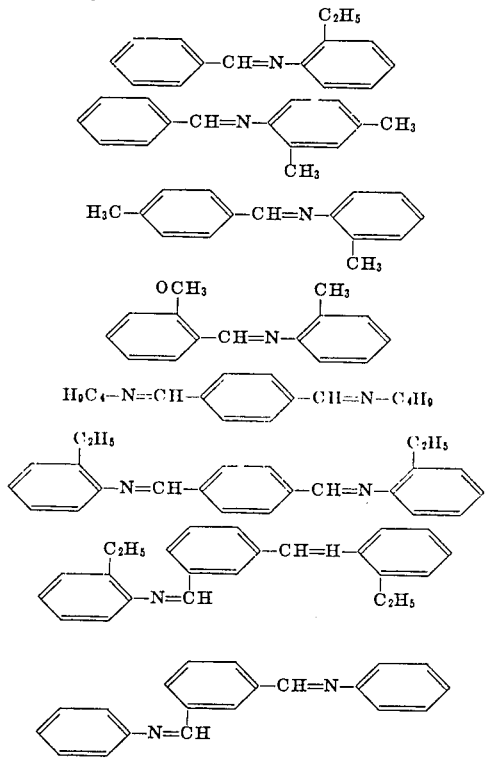

and

2. A composition as claimed in claim 1 wherein the amount of said agent is 1 to 3 percent by weight, based on said composition.

3. A composition as claimed in claim 1, said polyethylene having a density of about 0.920.

* * * * *